US012331407B2

(12) United States Patent
Yi et al.

(10) Patent No.: US 12,331,407 B2
(45) Date of Patent: Jun. 17, 2025

(54) COATED STEEL SHEET WITH THIN ALUMINIUM ALLOY COATING AND COATING METHOD THEREOF

(71) Applicant: IRONOVATION MATERIALS TECHNOLOGY CO., LTD., Jiangsu (CN)

(72) Inventors: Hongliang Yi, Liaoning (CN); Shu Zhou, Shanghai (CN); Xiaochuan Xiong, Jiangsu (CN)

(73) Assignee: IRONOVATION MATERIALS TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/008,576

(22) PCT Filed: Jul. 20, 2020

(86) PCT No.: PCT/CN2020/102906
§ 371 (c)(1),
(2) Date: Dec. 6, 2022

(87) PCT Pub. No.: WO2021/248635
PCT Pub. Date: Dec. 16, 2021

(65) Prior Publication Data
US 2023/0235439 A1 Jul. 27, 2023

(30) Foreign Application Priority Data
Jun. 8, 2020 (CN) .................. 202010509706.6

(51) Int. Cl.
*C23C 2/12* (2006.01)
*B21D 22/02* (2006.01)
(Continued)

(52) U.S. Cl.
CPC .............. *C23C 2/12* (2013.01); *B21D 22/022* (2013.01); *B32B 15/012* (2013.01); *B32B 15/04* (2013.01);
(Continued)

(58) Field of Classification Search
CPC ........... C23C 2/12; C23C 2/02; C23C 2/0224; C23C 2/20; C23C 2/26; C23C 2/29;
(Continued)

(56) References Cited

U.S. PATENT DOCUMENTS

| 4,500,364 A | 2/1985 | Krutenat |
| 4,837,091 A * | 6/1989 | Nickola ................. C23C 26/00 428/653 |

(Continued)

FOREIGN PATENT DOCUMENTS

| CN | 1145645 A | 3/1997 |
| CN | 102011082 A | 4/2011 |

(Continued)

OTHER PUBLICATIONS

Office Action dated Jul. 2, 2024, issued in corresponding Japanese Patent Application No. 2022-575401.
(Continued)

*Primary Examiner* — Michael E. La Villa
(74) *Attorney, Agent, or Firm* — Morgan, Lewis & Bockius LLP

(57) ABSTRACT

Coated steel sheet used for hot stamping has a thin aluminium alloy coating with coating thickness of 5~14 μm. The aluminium alloy coating has a FeAlSi inhibitive layer adjacent to a substrate steel sheet and an Al alloy layer outside the FeAlSi inhibitive layer. The thickness of the FeAlSi inhibitive layer is no more than 60% of the coating thickness and is 1.5~6.0 μm. Diameters of Kirkendall voids within 2 μm from an interface between the FeAlSi inhibitive
(Continued)

layer and the substrate steel to the interior of the substrate steel are no more than 2.5 μm, and the number of Kirkendall voids with a diameter of no less than 0.5 μm and no more than 2.5 μm does not exceed 15 per 35 μm. The coating method eliminates skip coating and resulting hot stamped component has excellent resistance spot welding performance.

22 Claims, 3 Drawing Sheets

(51) Int. Cl.
| | |
|---|---|
| B32B 15/01 | (2006.01) |
| B32B 15/04 | (2006.01) |
| B32B 15/18 | (2006.01) |
| B32B 15/20 | (2006.01) |
| C21D 8/02 | (2006.01) |
| C21D 9/46 | (2006.01) |
| C22C 21/00 | (2006.01) |
| C22C 21/02 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/18 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C22C 38/34 | (2006.01) |
| C22C 38/38 | (2006.01) |
| C22C 38/40 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C22C 38/58 | (2006.01) |
| C23C 2/02 | (2006.01) |
| C23C 2/20 | (2006.01) |
| C23C 2/26 | (2006.01) |
| C23C 2/28 | (2006.01) |
| C23C 28/02 | (2006.01) |
| C23C 30/00 | (2006.01) |

(52) U.S. Cl.
CPC ............ *B32B 15/043* (2013.01); *B32B 15/18* (2013.01); *B32B 15/20* (2013.01); *C21D 8/0205* (2013.01); *C21D 8/0278* (2013.01); *C21D 9/46* (2013.01); *C22C 21/00* (2013.01); *C22C 21/02* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/0224* (2022.08); *C23C 2/20* (2013.01); *C23C 2/26* (2013.01); *C23C 2/29* (2022.08); *C23C 28/02* (2013.01); *C23C 28/021* (2013.01); *C23C 28/023* (2013.01); *C23C 30/00* (2013.01); *C23C 30/005* (2013.01); *Y10T 428/12438* (2015.01); *Y10T 428/12451* (2015.01); *Y10T 428/12472* (2015.01); *Y10T 428/12736* (2015.01); *Y10T 428/12757* (2015.01); *Y10T 428/12764* (2015.01); *Y10T 428/12951* (2015.01); *Y10T 428/12958* (2015.01); *Y10T 428/12972* (2015.01); *Y10T 428/12979* (2015.01); *Y10T 428/24942* (2015.01); *Y10T 428/2495* (2015.01); *Y10T 428/24959* (2015.01); *Y10T 428/24967* (2015.01); *Y10T 428/24975* (2015.01); *Y10T 428/26* (2015.01); *Y10T 428/263* (2015.01); *Y10T 428/264* (2015.01); *Y10T 428/265* (2015.01)

(58) Field of Classification Search
CPC ....... C23C 30/00; C23C 30/005; C23C 28/02; C23C 28/021; C23C 28/023; B21D 22/022; B32B 15/012; B32B 15/04; B32B 15/043; B32B 15/18; B32B 15/20; C21D 8/0205; C21D 8/0278; C21D 9/46; C22C 21/02; C22C 21/00; C22C 38/02; C22C 38/04; C22C 38/06; C22C 38/08; C22C 38/12; C22C 38/14; C22C 38/16; C22C 38/18; C22C 38/20; C22C 38/22; C22C 38/24; C22C 38/26; C22C 38/28; C22C 38/32; C22C 38/34; C22C 38/38; C22C 38/40; C22C 38/42; C22C 38/44; C22C 38/46; C22C 38/48; C22C 38/50; C22C 38/54; C22C 38/58; Y10T 428/12438; Y10T 428/12451; Y10T 428/12757; Y10T 428/12736; Y10T 428/12764; Y10T 428/12958; Y10T 428/12972; Y10T 428/12979; Y10T 428/12951; Y10T 428/24942; Y10T 428/2495; Y10T 428/24959; Y10T 428/24967; Y10T 428/24975; Y10T 428/263; Y10T 428/264; Y10T 428/265; Y10T 428/26

See application file for complete search history.

(56) References Cited

U.S. PATENT DOCUMENTS

| | | | |
|---|---|---|---|
| 6,017,643 | A | 1/2000 | Kobayashi et al. |
| 11,248,276 | B2 | 2/2022 | Yi et al. |
| 11,530,474 | B2 | 12/2022 | Fujita et al. |
| 2020/0230918 | A1 | 7/2020 | Morishita et al. |
| 2021/0095368 | A1 | 4/2021 | Fujita et al. |

FOREIGN PATENT DOCUMENTS

| | | |
|---|---|---|
| CN | 103361588 A | 10/2013 |
| CN | 103614640 A | 3/2014 |
| CN | 103952653 A | 7/2014 |
| CN | 107119225 A | 9/2017 |
| CN | 108588612 A | 9/2018 |
| CN | 110484820 A | 11/2019 |
| CN | 110573644 A | 12/2019 |
| CN | 111394679 A | 7/2020 |
| EP | 3623493 A1 | 3/2020 |
| JP | 2013-166977 A | 8/2013 |

(56) References Cited

FOREIGN PATENT DOCUMENTS

| | | |
|---|---|---|
| JP | 2014-118628 A | 6/2014 |
| WO | 96/26301 A1 | 8/1996 |
| WO | 2019/160106 A1 | 8/2019 |

OTHER PUBLICATIONS

Office Action dated Aug. 5, 2024, issued in corresponding Canadian Patent Application No. 3185460.
International Search Report (with partial translation) and Written Opinion dated Feb. 3, 2021, issued in corresponding International Patent Application No. PCT/CN2020/102906.
First Office Action dated Jul. 17, 2020, issued in corresponding Chinese Patent Application No. 202010509706.6.
Gui Zhong-Xiang et al., "Cracking and interfacial debonding of the Al-Si coating in hot stamping of pre-coated boron steel", Applied Surface Science 316 (2014) pp. 595-603.
Extended European Search Report dated Jan. 20, 2023, issued in corresponding European Patent Application No. 20940247.8.
Office Action dated Dec. 16, 2024, issued in corresponding Chinese Patent Application No. 202080104181.6.
Office Action dated Nov. 14, 2024, issued in corresponding Korean Patent Application No. 10-2023-7000157.

* cited by examiner

COATED STEEL SHEET WITH THIN ALUMINIUM ALLOY COATING AND COATING METHOD THEREOF

TECHNICAL FIELD

The present invention relates to a coated steel sheet with a thin aluminium alloy coating and a coating method thereof.

BACKGROUND

In recent years, with the increasingly stringent requirements in energy and environmental protection, collision regulations, and passive safety of passengers, etc., hot stamping process has been increasingly applied to the design and manufacture of automotive components. In order to improve the strength and toughness of hot stamped components formed by aluminium-silicon coated plate, CN108588612A proposes to use a plate with a thin coating to obtain a hot-stamped component, in which an initial coating thickness of the coated steel sheet before hot stamping is 3~19 μm. However, in the production of plates with a thin coating, it is found that during production, such problems tend to arise as great fluctuation in the coating thickness, unstable production and local skip coating.

In addition, during hot-stamping, a blank of the coated steel sheet is first heated and kept at 880~960° C., so that Fe in the substrate steel and Al in the initial coating diffuse to each other to form a Fe—Al intermetallic compound on the coating side, and to form an interdiffusion layer of a high Al content between the substrate and a layer of Fe—Al intermetallic compound. Since the diffusion rate of Fe into the coating to form the Fe—Al intermetallic compound is much greater than that of Al into the substrate, as the diffusion continues, a large amount of Fe diffuses into the coating, and the vacancies in the interdiffusion layer cannot be filled in time, forming Kirkendall voids. The areas where these Kirkendall voids are located have high electrical resistance, so the spattering of sparks tends to occur during a welding process, leading to reduced welding performance. CN108588612A has found that the use of a thin initial coating can inhibit interdiffusion during hot-stamping to a certain extent. Therefore, compared with a thick initial coating, it can be expected that the thin initial coating will inhibit the formation and growth of Kirkendall voids during hot-stamping to a certain extent, which is conducive to improving resistance spot welding performance of a hot stamped component.

However, the inventor of the present application found that even with a thin initial coating, the resistance spot welding performance still needs to be further improved.

SUMMARY OF THE INVENTION

The present invention has been made in view of the above problems existing in the prior art. One object of the present invention is to provide a coated steel sheet with a thin aluminium alloy coating for hot stamping, which can eliminate skip coating and enable a hot stamped component obtained by the coated steel sheet to have excellent resistance spot welding performance.

In order to achieve the above object, a coating thickness of the aluminium alloy coating on at least one surface of the coated steel sheet of the present invention is 5~14 μm, wherein the aluminium alloy coating comprises: a FeAlSi inhibitive layer adjacent to a substrate steel and an Al alloy layer outside the FeAlSi inhibitive layer, wherein the thickness of the FeAlSi inhibitive layer is no more than 60% of the coating thickness and is 1.5~6.0 μm. Within 2 μm from an interface between the FeAlSi inhibitive layer and the substrate steel to the interior of the substrate steel, diameters of Kirkendall voids are no more than 2.5 μm, wherein the number of Kirkendall voids with a diameter of no less than 0.5 μm and no more than 2.5 μm does not exceed 15 per 35 μm, preferably not exceed 10 per 35 μm, more preferably not exceed 5 per 35 μm.

By reducing the thickness of the FeAlSi inhibitive layer, skip coating situation is eliminated and the fluctuation in the coating thickness is reduced, improving the production stability. In addition, since there are fewer and smaller Kirkendall voids in the substrate steel near the above mentioned interface, it facilitates further inhibiting the formation of large-sized voids during hot stamping, thereby improving the resistance spot welding performance of a hot stamped component formed subsequently.

Preferably, the coating thickness of the aluminium alloy coating on at least one surface is 6~13 μm, wherein the thickness of the FeAlSi inhibitive layer is no more than 50% of the coating thickness and is 1.5~5.0 μm. Within 2 μm from the interface to the interior of the substrate steel, the diameters of the Kirkendall voids are no more than 2.5 μm, and the number of Kirkendall voids with a diameter of no less than 0.5 μm and no more than 2.5 μm does not exceed 13 per 35 μm; and further preferably, the diameters of the Kirkendall voids are no more than 2.0 μm, and the number of Kirkendall voids with a diameter of no less than 0.5 μm and no more than 2.0 μm does not exceed 15 per 35 μm, and preferably not exceed 10 per 35 μm, more preferably not exceed 5 per 35 μm.

Preferably, the coating thickness of the aluminium alloy coating on at least one surface is 7~12 μm, wherein the thickness of the FeAlSi inhibitive layer is no more than 40% of the coating thickness and is 2.45~3.95 μm. Within 2 μm from the interface to the interior of the substrate steel, the diameters of the Kirkendall voids are no more than 2.5 μm, and the number of Kirkendall voids with a diameter of no less than 0.5 μm and no more than 2.5 μm does not exceed 13 per 35 μm; and further preferably, the diameters of the Kirkendall voids are no more than 2.0 μm, and the number of Kirkendall voids with a diameter of no less than 0.5 μm and no more than 2.0 μm does not exceed 15 per 35 μm, preferably not exceed 10 per 35 μm, and more preferably not exceed 5 per 35 μm.

Smaller and fewer Kirkendall voids further improve the resistance spot welding performance of a hot stamped component formed subsequently.

Unless otherwise stated, the coating thickness, the thickness of the FeAlSi inhibitive layer and the thickness of the Al alloy layer herein are, respectively, an average of at least 3 corresponding measurements.

In order to meet the requirements of a hot stamping process for the hardenability of the steel sheet, forming a martensite-dominated microstructure in a hot-stamped component and reaching a strength of 900 MPa~2200 MPa, the substrate steel sheet comprises the following constituents by weight: 0.05~0.45% C, 0.5~10% Mn, 0~0.01% B, 0~0.4% Nb+Ti+V, 0.01~2% Si, 0.01~2% Al, 0.01~5% Cr+Ni+Mo+Cu and 0~2% Cr, 0~2% Ni, 0~2% Mo and 0~2% Cu, and the balance of Fe and unavoidable impurity elements.

preferably, the substrate steel sheet comprises the following constituents by weight: 0.09~0.39% C, 0.6~3.5% Mn, 0~0.004% B, 0~0.4% Nb+Ti+V, 0.01~2% Si, 0.01~2% Al, 0.01~5% Cr+Mo+Ni+Cu and 0~2% Cr, 0~2% Ni, 0~2% Mo and 0~2% Cu, and the balance of Fe and unavoidable impurity elements.

More preferably, in order to achieve a hot-stamped component having a martensite-dominated microstructure and reaching a strength of 1400 MPa~2100 MPa, the substrate steel sheet comprises the following constituents by weight: 0.18~0.39% C, 0.6~3.5% Mn, 0~0.004% B, 0.05~0.3% Nb+Ti+V, 0.01~2% Si, 0.01~2% Al, 0.01~5% Cr+Mo+Ni+Cu and 0~2% Cr, 0~2% Ni, 0~2% Mo and 0~2% Cu, and the balance of Fe and unavoidable impurity elements.

Preferably, the thickness of the substrate steel sheet is 0.5~3.0 mm.

Another object of the present invention is to provide a coating method for coating a thin aluminium alloy coating on a substrate steel sheet for hot stamping, which can eliminate skip coating and enable a hot stamped component obtained by the coated steel sheet to have excellent resistance spot welding performance.

In order to achieve the above mentioned object, in the coating method of the present invention, the composition of a coating solution comprises by weight: 9%~12% Si and no more than 4% Fe, the balance of Al and unavoidable impurities.

Preferably, Si content in the coating solution is 9.2%~11.2% by weight.

The coating method according to the present invention comprises:

a) pre-treating a substrate steel sheet before coating;
b) after heating the pre-treated substrate steel sheet, cooling it to a predetermined temperature in the range of 610~650° C., preferably 620~645° C., more preferably 625~639° C., further preferably 625~635° C.;
c) dipping the substrate steel sheet cooled to the predetermined temperature in step b) in a heated coating solution for 2~7 seconds for hot-dip coating, during which the temperature of the coating solution is higher than the predetermined temperature and maintained at 630~670° C., preferably 640~660° C.;
d) after the substrate steel sheet is out of the coating solution and before the coating solution on at least one surface solidifies, removing excessive coating solution on the at least one surface by air knife purge to control the coating thickness on the at least one surface; and
e) cooling the steel sheet to room temperature to obtain a coated steel sheet with a thin aluminium alloy coating.

The above mentioned coating method can be carried out in a continuous hot-dip coating process. Pre-treating the substrate steel sheet includes, for example, degreasing, washing, descaling, warm washing, assistant coating, drying and the like. In the process of hot-dip aluminium coating on the above mentioned steel sheet, the heating of the substrate steel sheet can be performed by induction heating, heating furnace and other methods. Preferably, the temperature of the coating solution is higher than the predetermined temperature of the steel sheet entering the coating solution (i.e., the temperature of the steel sheet entering the pot) by 5~20° C., more preferably, 7~15° C. In step e), a cooling rate of the steel sheet is preferably no less than 5° C./s. In addition, those skilled in the art will understand that any range or any value within the above ranges is applicable to the present invention. For example, the above mentioned predetermined temperature can be taken from any range within the range of 610~650° C. or be any specific value within the range of 610~650° C., any range such as 610~620° C., 635~650° C., and 635~645° C., or any value such as 612° C., 614° C., 616° C., 618° C., 620° C., 622° C., 624° C., 626° C., 628° C., 630° C., 632° C., 634° C., 636° C., 638° C., 640° C., 642° C., 644° C., 646° C., 648° C. and the like.

The coated steel sheet obtained by the coating method of the present invention has a coating thickness of 5~14 μm, preferably 6~13 μm, and more preferably 7~12 μm, wherein the thickness of a FeAlSi inhibitive layer in the coating is no more than 60% of the coating thickness and is in the range of 1.5~6 μm, preferably no more than 50% of the coating thickness and in the range of 1.5~5.0 μm, and more preferably no more than 40% of the coating thickness and in the range of 2.45~3.95 μm, wherein within 2 μm from an interface between the FeAlSi inhibitive layer and a substrate steel to the interior of the substrate steel, the diameters of Kirkendall voids are no more than 2.5 μm, wherein the number of Kirkendall voids with a diameter of no less than 0.5 μm and no more than 2.5 μm does not exceed 15 per 35 μm, preferably not exceed 13 per 35 μm, and more preferably not exceed 5 per 35 μm; and further preferably, the diameters of the Kirkendall voids are no more than 2.0 μm, and the number of Kirkendall voids with a diameter of no less than 0.5 μm and no more than 2.0 μm does not exceed 15 per 35 μm, preferably not exceed 10 per 35 μm, and more preferably not exceed 5 per 35 μm.

In the method of the present invention, the temperature of the coating solution in an aluminium pot and the temperature of the steel sheet entering the aluminium pot are lowered, Si content in the coating solution is increased and the dwell time of the steel sheet in the coating solution is shortened. The synergistic effect of these factors inhibits interdiffusion between Fe in the substrate and Al in the coating, such that on the one hand the obtained coating has a stable coating thickness with skip coating eliminated; on the other hand, the formation of Kirkendall voids in the substrate steel near the interface between the FeAlSi inhibitive layer and the substrate steel is inhibited, resulting in fewer voids with smaller diameters, thereby improving the resistance spot welding performance of the hot stamped component formed by the coated steel sheet.

DETAILED DESCRIPTION OF THE INVENTION

Figure 1:
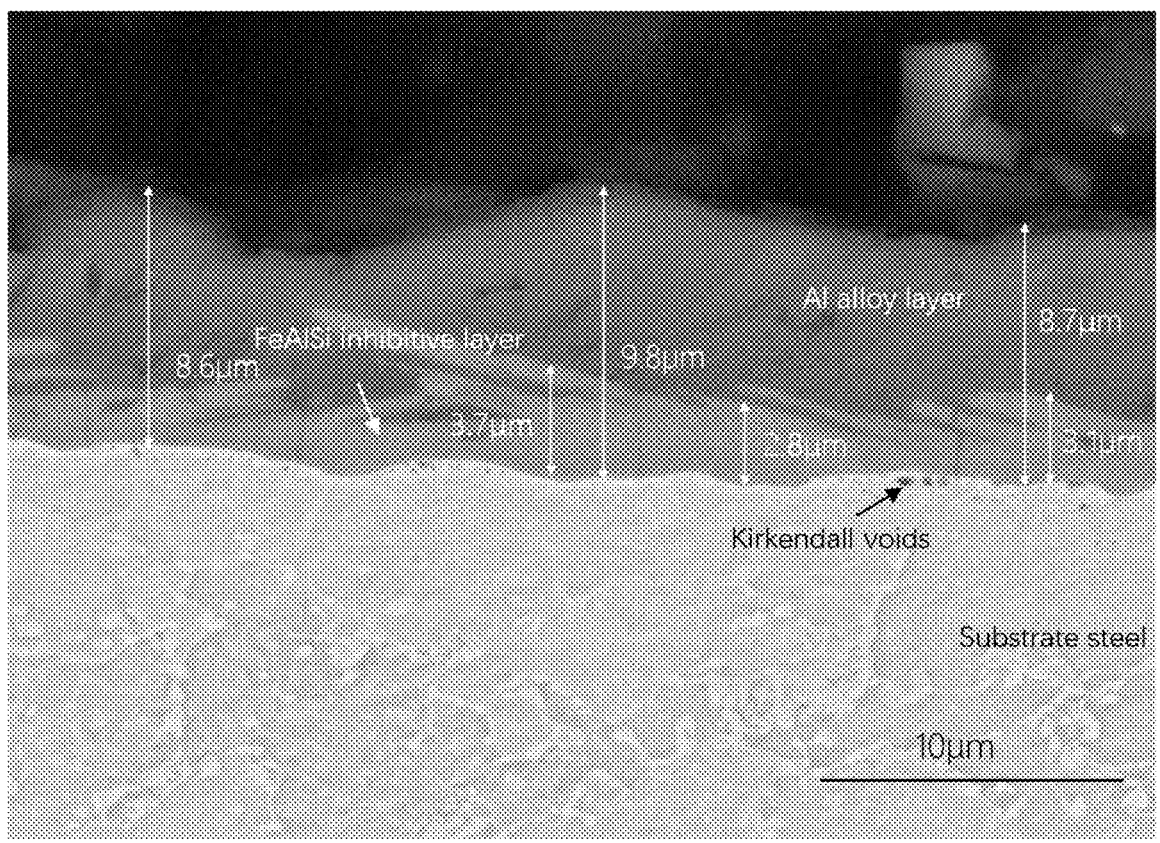
FIG. 1 is an SEM photo of local coating morphology of a coated steel sheet according to Embodiment 5 of the present invention.

The present invention will be described in more detail below with reference to the exemplary embodiments. The following embodiments or experimental data are intended to exemplarily illustrate the present invention, It should be clear to those skilled in the art that the present invention is not limited to these embodiments or experimental data.

The present invention provides a coated steel sheet for hot stamping and a coating method thereof.

In a hot-dip aluminium coating process, there would be an alloying reaction between Fe in the surface of a substrate steel and Al, Si in a coating solution, forming a FeSiAl intermetallic alloy compound layer, i.e., FeAlSi inhibitive layer, on the surface of the substrate steel. With the formation of the FeAlSi inhibitive layer on the surface of the substrate steel, the interdiffusion of Fe and Al is significantly reduced. Outside the FeAlSi inhibitive layer is an Al alloy layer, the thickness of which can be adjusted according to air knife purge. When producing a sheet with a thin coating, in the case of a determined coating thickness, if the Al alloy layer in the coating is too thin, it will lead to problems such as unstable coating thickness of the steel sheet and frequently occurred local skip coating phenomenon during continuous production, so the Al alloy layer should not be too thin. Therefore, a thin FeAlSi inhibitive layer needs to be obtained on the surface of the steel sheet during coating to ensure a sufficient thickness of the Al alloy layer.

In addition, in the prior art, compared with a heating process of hot stamping, since the temperature of the steel sheet before entering the coating solution is no more than 700° C. and the hot-dip coating time is only a few seconds, therefore, it is generally believed that the diffusion of alloying elements in the hot-dip coating process is slow, and there would be no Kirkendall effect. However, after in-depth research, the inventors of the present invention have found that since outside a steel substrate is liquid aluminium in the hot-dip coating process, Fe atoms thus can still rapidly react with Al and Si in the liquid aluminium to form an intermetallic compound (FeAlSi inhibitive layer). The Kirkendall effect is essentially caused by the fact that the diffusion rate of Fe to the outside is much greater than that of Al into the iron substrate, and the existence of FeAlSi inhibitive layer of a few microns in the coating formed by hot-dip coating fully indicates that there is indeed a phenomenon of Fe diffusion to the outside in the hot-dip coating process, that is, there is a possibility of forming Kirkendall voids. Through extensive microscopic observation, the present inventors have found that there are indeed a large number of Kirkendall voids within 2 μm from an interface between the FeAlSi inhibitive layer and the substrate steel to the interior of the substrate steel, and their sizes are much smaller than the sizes of the voids after hot stamping, so they are not easy to be noticed. The present invention finds that the thicker the FeAlSi inhibitive layer, the more Fe has diffused to the outside, and the more easily Kirkendall voids would be formed. Therefore, reducing the thickness of the FeAlSi inhibitive layer can reduce the diffusion of Fe atoms in the substrate steel to the outside, thereby reducing the formation of Kirkendall voids.

Meanwhile, the present invention finds that in a subsequent hot-stamping process, it is quite easy for the Kirkendall effect voids formed in the hot-dip coating process to grow rapidly, significantly increasing the resistance of the coating during spot welding, which prone to cause a spattering of sparks during welding and seriously affect the resistance spot welding performance of the hot stamped component. Therefore, in order to ensure the resistance spot welding performance of a final part, the present invention desires to achieve the purpose of suppressing the formation of Kirkendall voids by controlling the conditions of the hot-dip coating.

Accordingly, the method of the present invention aims to obtain a thin FeAlSi inhibitive layer and inhibit the formation of Kirkendall voids within a substrate steel near an interface between a FeAlSi inhibitive layer and the substrate steel, to improve the stability of the coating thickness, eliminate skip coating situation and improve the resistance spot welding performance of a component formed by subsequently hot-stamping the coated steel sheet.

A coating solution used in the present invention comprises by weight: 9%~12% Si, no more than 4% Fe, the balance of Al or Al alloy and unavoidable impurities.

Preferably, Si content in the coating solution is 9.2%~11.2% by weight.

The coating method for a coated steel sheet for hot stamping according to the present invention comprises:
 a) pre-treating a substrate steel sheet before coating;
 b) after heating the pre-treated substrate steel sheet, cooling it to a predetermined temperature in the range of 610~650° C., preferably 620~645° C., more preferably 625~639° C., further preferably 625~635° C.;
 c) dipping the substrate steel sheet cooled to the predetermined temperature in step b) in a heated coating solution for 2~7 seconds for hot-dip coating, during which the temperature of the coating solution is higher than the predetermined temperature and maintained at 630~670° C., preferably 640~660° C.;
 d) after the substrate steel sheet is out of the coating solution and before the coating solution on at least one surface solidifies, removing excessive coating solution on the at least one surface by air knife purge to control a coating thickness on the at least one surface; and
 e) cooling the steel sheet to room temperature to obtain a coated steel sheet with a thin aluminium alloy coating.

In the above mentioned method, pre-treating the substrate steel sheet includes, for example, degreasing, washing, descaling, warm washing, assistant coating, drying and the like. In step c), preferably, the temperature of the coating solution is higher than the predetermined temperature of the steel sheet entering the coating solution by 5~20° C., more preferably, 7~20° C. In step e), a cooling rate of the steel sheet is preferably no less than 5° C./s.

In the method of the present invention, a coating solution containing a high Si content is selected. As the Si content in the coating solution increases, the melting point of the coating solution becomes lower, which facilitates lowering the temperature of the coating solution and thereby inhibiting the interdiffusion of Al and Fe atoms to obtain a reduced thickness of the FeAlSi inhibitive layer, slowing down the formation and growth of Kirkendall voids near the surface of the substrate steel sheet during hot-dip coating as well as during subsequently hot stamping the coated steel sheet. Therefore, the Si content is no less than 9%. However, the Si content should not be too high since an excessively high Si content would increase the resistivity of the alloyed layer in the coating of the steel sheet after hot stamping the coated steel sheet, reducing the welding performance of a hot stamped component formed by the coated steel sheet. Therefore, the Si content cannot exceed 12%. Preferably, the Si content in the present invention is 9.2%~11.2%.

Secondly, the present invention proposes to lower the temperature of the coating solution and the predetermined temperature of the steel sheet entering the coating solution (i.e., the temperature of the steel sheet entering the pot) to inhibit the formation of Kirkendall voids. As mentioned above, during the formation of the FeSiAl inhibitive layer, Fe atoms in the substrate steel diffuse into the coating solution to form a FeSiAl intermetallic compound, meanwhile Al atoms diffuse into the Fe substrate. The diffusion of Fe atoms and Al atoms in the substrate occurs based on a vacancy mechanism, that is, diffusion is achieved by exchanging positions of metal atoms and vacancies. When the rate of Al atoms entering the substrate is not enough to compensate for the number of Fe atoms diffusing away from the substrate, voids will be formed in the substrate due to the aggregation of vacancies. Therefore, inhibiting the thickness and growth rate of the FeAlSi inhibitive layer can inhibit the formation of Kirkendall effect voids in nature. It is well known that temperature has a significant influence on diffusion speed, so lowering the temperature of the coating solution and the predetermined temperature of the steel sheet entering the coating solution can inhibit the formation of Kirkendall voids. On the one hand, lowering the predetermined temperature of the steel sheet entering the coating solution is considered. The difference in the diffusion rates of Fe and Al atoms increases at high temperatures, resulting in the formation of more large-sized Kirkendall voids. Experimental data show that when the predetermined temperature of the steel sheet entering the coating solution was higher than 655° C., more large-sized Kirkendall voids were observably formed in the substrate steel near the above-mentioned interface. However, during hot-dip coating, in order to ensure the platability of the steel sheet and prevent problems such as skip coating on the surface, the predetermined temperature of the steel sheet entering the coating solution should not be too low. Experimental data show that when the predetermined temperature of the steel sheet entering the coating solution was lower than 610° C., serious skip coating occurred. Therefore, according to the present invention, the predetermined temperature of the steel sheet entering the coating solution is designed to be 610~650° C., preferably, 620~645° C., more preferably, 620~639° C., further preferably, 625~635° C. On the other hand, it is considered that lowering the temperature of the coating solution is conducive to inhibiting the alloying reaction between Fe, Al and Si atoms, so as to form a thin inhibitive layer. However, correspondingly, in order to ensure the fluidity and uniformity of the coating solution, the temperature of the coating solution should not be too low. Therefore, the temperature of the coating solution is designed to be higher than the predetermined temperature and to be 630~670° C., preferably, 640~660° C.

Further, the present invention proposes to shorten the dwell time of the steel sheet in the coating solution. First, an excessively long dwell time would facilitate continuous interdiffusion of Fe and Al, resulting in the thickening of the FeAlSi inhibitive layer and the formation of Kirkendall voids. Second, a production line is limited in length and if the dwell time is too long, the operating speed of the production line must be reduced, which affects the production efficiency and increases costs. Therefore, the dwell time of the steel sheet in the coating solution needs to be controlled to be 2~7 seconds.

Finally, the thickness of the Al alloy layer is controlled by maintaining high-strength purging of an air knife, so as to obtain a steel sheet with a thin aluminium alloy coating. Therefore, after the substrate steel sheet is out of the coating solution and before the coating solution on at least one surface solidifies, the excessive coating solution on the at least one surface is removed by air knife purge to control the coating thickness on the at least one surface. Subsequently, the steel sheet is cooled to room temperature at a cooling rate preferably no lower than 5° C./s to obtain a coated steel sheet with a thin aluminium alloy coating.

In addition, preferably, a balance is stricken between a relatively high temperature of the coating solution to ensure the platability and a low predetermined temperature of the steel sheet entering the coating solution to ensure a low reaction rate at the interface and to reduce the formation of Kirkendall voids. The present invention points out particularly that coating is carried out in the condition that the above mentioned predetermined temperature is lower than the temperature of the coating solution. Preferably, the predetermined temperature being below the temperature of the coating solution no less than 5° C. is conducive to ensuring the platability while slowing down the reaction rate at the interface to reduce Kirkendall voids. Meanwhile, since an excessively large difference between the temperatures of the steel sheet and the coating solution will cause the temperature of the coating solution unstable, the temperature difference is designed not to exceed 20° C. in the present invention. Preferably, the temperature difference is 7° C.~15° C.

By the above method of the present invention, a coated steel sheet with a thin aluminium alloy coating for hot stamping is obtained. The thickness of the coated steel sheet is 0.5~3.0 mm. On either surface of the steel sheet, the coating thickness of the aluminium alloy coating is 5~14 μm, preferably 6~13 μm, more preferably 7~12 μm.

The above-mentioned aluminium alloy coating has a unique coating structure, comprising:

a FeAlSi inhibitive layer adjacent to a substrate steel, wherein the thickness of the FeAlSi inhibitive layer is no more than 60% of the coating thickness and is 1.5~6 μm, preferably no more than 50% of the coating thickness and 1.5~5 μm, more preferably no more than 40% of the coating thickness and 2.45~3.95 μm. Within 2 μm from an interface between the FeAlSi inhibitive layer and the substrate steel to the interior of the substrate steel, diameters of Kirkendall voids are no more than 2.5 μm, wherein the number of Kirkendall voids with a diameter of no less than 0.5 μm and no more than 2.5 μm does not exceed 15 per 35 μm, preferably not exceed 13 per 35 μm, and more preferably not exceed 5 per 35 μm. Further preferably, the diameters of the Kirkendall voids are no more than 2.0 μm, and the number of Kirkendall voids with a diameter of no less than 0.5 μm and no more than 2.0 μm does not exceed 13 per 35 μm, preferably not exceed 10 per 35 μm, and more preferably not exceed 5 per 35 μm; and an Al alloy layer outside the FeAlSi inhibitive layer.

The FeAlSi inhibitive layer is a FeSiAl alloyed compound layer formed by the reaction between Al atoms and Si atoms in the coating solution and Fe atoms in the surface of the steel sheet when the steel sheet is immersed in the coating solution, main composition consisting of $Fe_2SiAl_7$, wherein the mass ratio of Si element to the sum of Si and Al elements is greater than 0.12, higher than the Si content in the coating solution. The thickness of the Al alloy layer is adjusted by an air knife to achieve different thicknesses of the aluminium-silicon coatings.

In order to meet the requirements of the hot stamping process for the hardenability of the steel sheet, forming a martensite-dominated microstructure in a hot-stamped component and reaching a strength of 900 MPa~2200 MPa, the substrate steel sheet comprises the following constituents by weight: 0.05~0.45% C, 0.5~10% Mn, 0~0.01% B, 0~0.4% Nb+Ti+V, 0.01~2% Si, 0.01~2% Al, 0.01~5% Cr+Ni+Mo+Cu and 0~2% Cr, 0~2% Ni, 0~2% Mo and 0~2% Cu, as well as unavoidable impurity elements.

In the coated steel sheet of the present invention, a small amount of the Kirkendall voids are presented in the substrate steel near the interface between the FeAlSi inhibitive layer and the substrate steel and have small diameters, which helps to decrease the formation of large-sized voids in the coating of the hot-stamped component during hot stamping, thereby ensuring that the component has good resistance spot welding performance. When the coating thickness is set, a thin FeAlSi inhibitive layer means a thicker Al alloy layer, which is beneficial for air knife control, improving the stability of the coating thickness and preventing the occurrence of skip coating phenomenon.

As an example, tested substrate steel sheets have the compositions shown in Table 1, and its corresponding manufacturing process is as follows:

a) Steelmaking: smelting by a vacuum induction furnace, an electric furnace or a converter according to the compositions in Table 1, using continuous casting technology to produce a casting billet, or directly using a thin slab continuous casting and rolling process;

b) Hot rolling: the billet is heated to 1120~1280° C. for hot rolling; the total rolling reduction of the hot rolling is no less than 50%; the final rolling is carried out at a temperature of no less than 800° C. to obtain a hot-rolled steel sheet; and the steel sheet is curled at a temperature of no more than 700° C. to form a hot-rolled steel coil; the hot-rolled coil is acid-pickled to remove oxide scales generated during the hot rolling process; and c) Cold rolling: the acid-pickled hot-rolled coil is cold rolled; the rolling reduction of the cold rolling is 30%~70% to obtain a cold-rolled steel coil of 1.4 mm.

TABLE 1

The chemical compositions of the substrate steel sheets
(wt %, the balance of Fe and other unavoidable impurities)

| substrate steel sheet | C | Si | Mn | B | Al | Cr | Nb | Ti | V |
|---|---|---|---|---|---|---|---|---|---|
| substrate steel 1 | 0.10 | 0.20 | 2.5 | 0.0031 | 0.04 | 0.22 | / | 0.04 | / |
| substrate steel 2 | 0.21 | 0.25 | 1.4 | 0.0022 | 0.04 | 0.25 | / | 0.04 | / |
| substrate steel 3 | 0.34 | 0.61 | 1.9 | 0.0025 | 0.65 | 0.15 | 0.04 | ~ | 0.06 |

The obtained substrate steel sheet is coated according to a coating process presented in Table 2. The target coating thickness is 8~12 μm, wherein a coating solution comprises by weight: 9%~12% Si, no more than 4% Fe, the balance of Al or Al alloy and unavoidable impurities. The coating process in Table 2 comprehensively takes the influences of the process parameters of hot-dip coating into consideration, such as temperature of the coating solution, predetermined temperature of the steel sheet entering the coating solution (i.e., the temperature of the steel sheet entering the pot), temperature difference between the coating solution and the steel sheet, hot-dip coating time, and Si content in the coating solution.

TABLE 2

List of the parameters of the coating process

| Sample | Substrate steel sheet | Temperature of coating solution ° C. | Si content in the coating solution % | Temperature of the steel sheet entering the pot ° C. | Hot-dip coating time s | Target coating thickness μm |
|---|---|---|---|---|---|---|
| Embodiment 1 | Substrate steel sheet 1 | 645 | 10.5 | 639 | 3.5 | 12 |
| Comparison example 1 | Substrate steel sheet 1 | 645 | 8.2 | 639 | 3.5 | 12 |
| Embodiment 2 | Substrate steel sheet 2 | 643 | 9.7 | 635 | 2.5 | 10 |
| Embodiment 3 | Substrate steel sheet 2 | 640 | 9.7 | 629 | 5 | 10 |
| Comparison example 2 | Substrate steel sheet 2 | 643 | 9.7 | 635 | 10 | 10 |
| Embodiment 4 | Substrate steel sheet 2 | 635 | 9.7 | 625 | 4.5 | 9 |
| Embodiment 5 | Substrate steel sheet 2 | 640 | 9.7 | 633 | 3.5 | 9 |
| Embodiment 6 | Substrate steel sheet 2 | 650 | 9.7 | 639 | 3.2 | 9 |
| Embodiment 7 | Substrate steel sheet 2 | 655 | 9.7 | 643 | 2.5 | 9 |
| Comparison example 3 | Substrate steel sheet 2 | 640 | 9.7 | 604 | 3.5 | 9 |
| Comparison example 4 | Substrate steel sheet 2 | 640 | 9.7 | 675 | 3.5 | 9 |
| Embodiment 8 | Substrate steel sheet 3 | 640 | 9.7 | 635 | 3.5 | 8 |

TABLE 2-continued

List of the parameters of the coating process

| Sample | Substrate steel sheet | Temperature of coating solution ° C. | Si content in the coating solution % | Temperature of the steel sheet entering the pot ° C. | Hot-dip coating time s | Target coating thickness μm |
|---|---|---|---|---|---|---|
| Comparison example 5 | Substrate steel sheet 3 | 610 | 9.7 | 635 | 3.5 | 8 |
| Comparison example 6 | Substrate steel sheet 3 | 680 | 9.7 | 635 | 3.5 | 8 |

After treatment by the above coating process, macro inspection of the surface quality of the steel coil is carried out to detect skip coating situation on the surface. It should be noted that the skip coating situation on the surface mentioned herein includes any situation of exposure of the substrate steel sheet and exposure of the FeAlSi inhibitive layer. Meanwhile, the coating thickness and the thickness of the FeAlSi inhibitive layer therein are determined as follows: five positions at ⅙, ⅓, ½, ⅔ and ⅚ of the coil width are selected; the thickness of the FeAlSi inhibitive layer and the coating thickness are measured with a scanning electron microscopy (SEM); and the measured results at the five positions are averaged with a deviation.

The method of determining the number of the Kirkendall voids: in the field of view of the SEM, along the surface of the substrate steel, Kirkendall voids within the range of a length of 35 μm are counted, and their diameters are measured. Method of determining the diameter of a Kirkendall void: in the same field of view, the longest and shortest diameters of the void are measured and half of the sum of the two is used as the diameter of the void.

The coating structure, macroscopic surface and the statistical results on the number of the Kirkendall voids are listed in Table 3.

Referring to Embodiments 1~8, when the target coating thickness was 8~12 μm, the thickness of the FeAlSi inhibitive layer obtained according to the method of the present invention was controlled to be about 2.9~4.1 μm, such that the thickness of the Al alloy layer was controlled to be about 5.1~8 μm, wherein the FeAlSi inhibitive layer accounted for about 29%~45% of the coating thickness. In this case, although the coating thickness of the steel sheet is thin, since the FeAlSi inhibitive layer is relatively thin, the thickness of the Al alloy layer can still be adjusted by air knife purge to easily achieve the control of the target coating thickness in the production process, leading to small thickness fluctuation in the final coating without skip coating phenomenon. In addition, the maximum diameter of the Kirkendall voids near the interface between the substrate steel and the coating was no more than 2 μm, and the number of the Kirkendall voids generally did not exceed 13 per 35 μm, which facilitates improving the resistance spot welding performance of the coated steel sheet after hot stamping. For example, a comparison of the data of Embodiments 5 and 8 shows that the difference between the temperature of the coating solution and the temperature of the steel sheet entering the pot was 7° C. in Embodiment 5, and the difference was 5° C. in Embodiment 8. The number of Kirkendall voids in Embodi-

TABLE 3

Information on coating structure, macroscopic surface and number of Kirkendall voids

| Sample | Thickness of FeAlSi inhibitive layer μm | Coating thickness μm | Skip coating (yes/no) | Maximum diameter of void μm | Number of voids per 35 μm |
|---|---|---|---|---|---|
| Embodiment 1 | 3.4 ± 0.20 | 11.4 ± 0.16 | no | 1.12 | 6 |
| Comparison example 1 | 7.5 ± 0.82 | 10.9 ± 1.31 | yes | 1.36 | 17 |
| Embodiment 2 | 3.1 ± 0.23 | 9.3 ± 0.31 | no | 0.83 | 5 |
| Embodiment 3 | 3.3 ± 0.41 | 10.2 ± 0.32 | no | 0.72 | 7 |
| Comparison example 2 | 6.8 ± 0.55 | 10.0 ± 1.15 | yes | 1.83 | 22 |
| Embodiment 4 | 2.9 ± 0.22 | 10.0 ± 0.56 | no | 0.57 | 4 |
| Embodiment 5 | 3.2 ± 0.37 | 9.0 ± 0.54 | no | 0.65 | 5 |
| Embodiment 6 | 4.1 ± 0.46 | 9.2 ± 0.35 | no | 1.37 | 9 |
| Embodiment 7 | 3.9 ± 0.61 | 9.6 ± 0.52 | no | 1.44 | 13 |
| Comparison example 3* | 1.2 ± 0.85 | 9.1 ± 1.78 | yes | / | 0 |
| Comparison example 4 | 6.7 ± 0.62 | 8.6 ± 0.71 | yes | 1.71 | 29 |
| Embodiment 8 | 3.6 ± 0.32 | 8.6 ± 0.48 | no | 0.85 | 8 |
| Comparison example 5* | 1.4 ± 0.93 | 8.2 ± 2.67 | yes | 0.51 | 1 |
| Comparison example 6 | 6.6 ± 0.56 | 8.5 ± 1.45 | yes | 1.52 | 25 |

*Skip coating in Comparative Examples 3 and 5 is too serious. The above values are taken from parts of measurable area and cannot reflect the overall state of the coating.

ment 8 was 8 per 35 μm, whereas the number of Kirkendal voids in Embodiment 5 was 5 per 35 μm. It can be seen that an appropriate temperature difference is conducive to further reducing the formation of Kirkendall voids.

FIG. 1 is an SEM photo of local coating morphology of the coated steel sheet according to Embodiment 5 of the present invention. The coating thickness was about 9.0 μm, wherein the thickness of the FeAlSi inhibitive layer was about 3.2 μm; the diameters of the Kirkendall voids were no more than 2.5 μm, wherein the number of Kirkendall voids with a diameter in the range of 0.5 μm~2.5 μm was about 5 per 35 μm.

Figure 2:
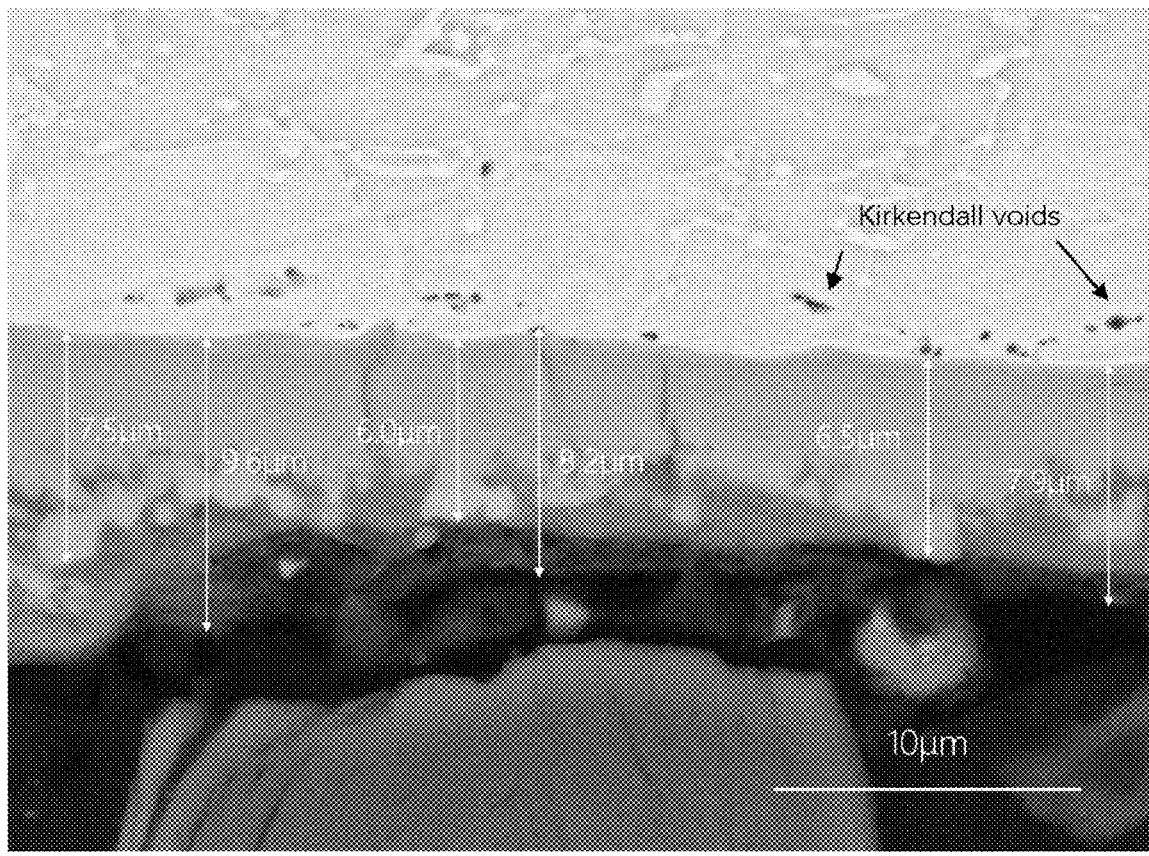
FIG. 2 is an SEM photo of local coating morphology of a coated steel sheet according to Comparison Example 4.

FIG. 2 is an SEM photo of local coating morphology of the coated steel sheet according to Comparison Example 4. The coating thickness was about 8.6 μm, wherein the thickness of the FeAlSi inhibitive layer was about 6.7 μm, the number of Kirkendall voids with a diameter in the range of 0.5 μm~2.5 μm was about 29 per 35 μm.

The parameters of the coating process for Embodiment 5 and Comparison Example 4 differ only in the temperature of the steel sheet entering the pot, wherein Comparison Example 4 had a significantly high temperature of the steel sheet entering the pot. Therefore, more Kirkendall voids and thicker FeAlSi inhibitive layer in Comparison Example 4 are induced by the high temperature of the steel sheet entering the pot. It can be seen that a high temperature of the steel sheet entering the pot is undesirable.

Figure 3:
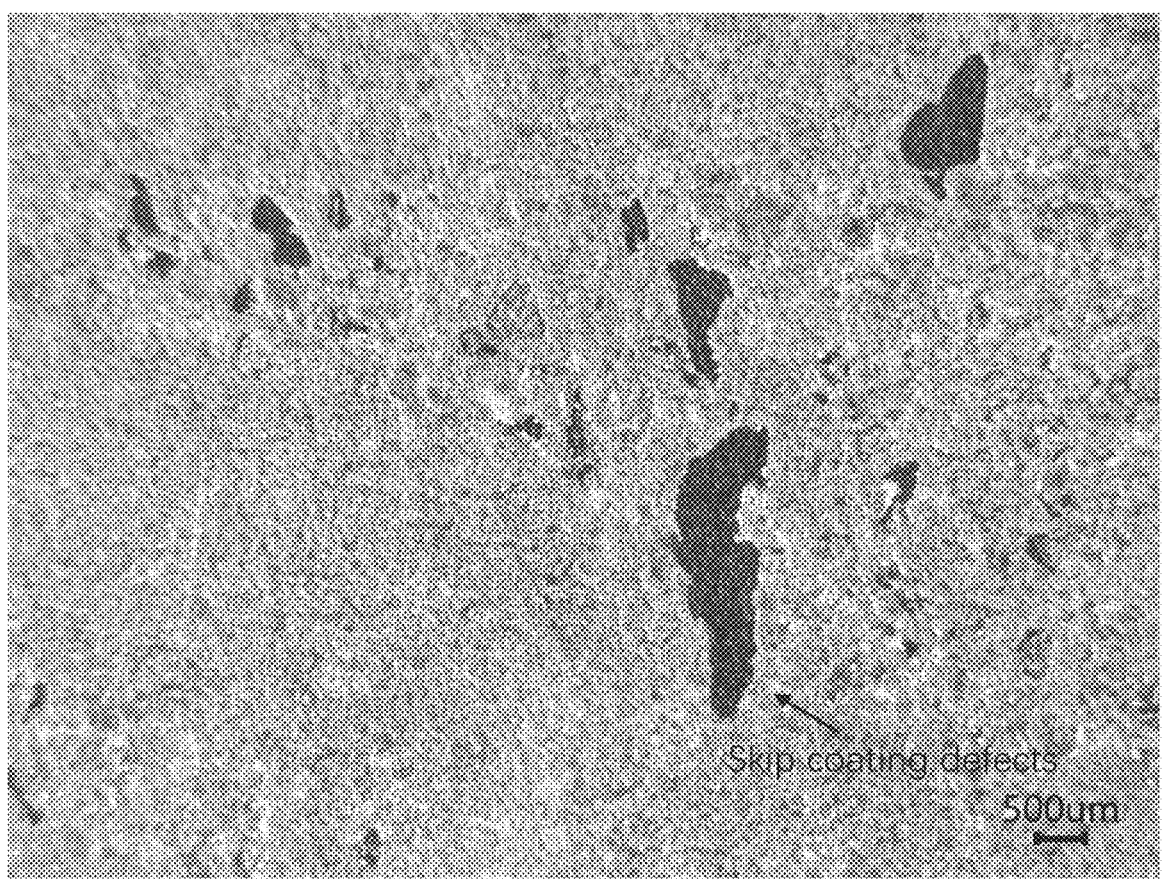
FIG. 3 is a photo of typical skip coating defects of the coated steel sheet according to Comparison Example 4.

FIG. 3 is a photo of typical skip coating defects of the coated steel sheet of Comparison Example 4. It can be seen clearly that in some areas, serious skip coating occurs. This is because compared with Embodiment 5, the higher temperature of the steel sheet entering the pot in Comparison Example 4 accelerates the diffusion, such that the generated FeAlSi inhibitive layer was thicker, accordingly, the Al alloy layer was thinner. As a result, the requirements for air knife purge were high, increasing difficulties in control and thereby leading to skip coating.

Each Comparative Example shows different degrees of skip coating and has large Kirkendall voids in a great amount. It is because: the Si content in the aluminium coating solution is too low in Comparative Example 1; the dwell time of the steel sheet in the aluminium coating solution is too long in Comparative Example 2; the temperature of the steel sheet entering the pot is too high in Comparative Example 4; and the temperature of the coating solution is too high in Comparative Example 6. The above four situations all lead to a finally obtained FeAlSi inhibitive layer of a thicker thickness, reaching 6.6~7.5 μm. As a result, the thickness of the Al alloy layer is thin, and the measured results of the thickness varies greatly among positions, reflecting poor thickness uniformity, resulting in obvious fluctuations in the final coating thickness and skip coating exited locally, which affects the production stability of the steel sheet. In addition, in the above four cases, the number of Kirkendall voids with a diameter of 0.5 μm~2.5 μm in the substrate steel near the interface between the substrate steel and the FeAlSi inhibitive layer is high, reaching 17~29 per 35 μm. These large Kirkendall voids weaken the resistance spot welding performance of the hot stamped components obtained subsequently. Therefore, low Si content, long dwell time, high temperature of the steel sheet entering the pot and high temperature of the coating solution all facilitate diffusion, resulting in the formation of more and larger Kirkendall voids. Therefore, all the four factors must be controlled simultaneously to inhibit the formation of Kirkendall voids under their synergistic effect.

In addition, in Comparison Example 3, due to the low temperature of the steel sheet entering the pot, the surface temperature of the steel sheet is close to the solidifying point of the Al—Si alloy. As a result, the steel sheet has poor platability, leading to skip coating issue presented in many areas. The large deviation also indicates that the thickness of the obtained FeAlSi inhibitive layer and the coating thickness were quite uneven. In Comparison Example 5, since the temperature of the coating solution is too low, the fluidity and uniformity of the coating solution are poor. This also leads to poor coating quality, uneven coating thickness (with a large deviation), and locally existed skip coating phenomenon.

In view of the above and the data listed in Tables 2 and 3, it can be seen that the Si content in the coating solution, the temperature of the steel sheet entering the pot, the temperature of the coating solution and the hot-dip coating time all have significant impacts on the thickness uniformity of the coating, skip coating and the formation of Kirkendall voids. Any condition exceeding a predetermined range would result in uneven coating thickness, skip coating or the formation and growth of more Kirkendall voids, weakening the performance of the product. The synergistic effect of the ranges of the Si content in the coating solution, the temperature of the steel sheet entering the pot, the temperature of the coating solution and the hot-dip coating time selected in the present invention not only eliminates skip coating situation but also reduces the number of large-sized Kirkendall voids, improving the yield of the coated steel sheet.

Accordingly, the resistance spot welding performance of a hot stamped component formed subsequently is also affected by the synergistic effect of the Si content in the coating solution, the temperature of the steel sheet entering the pot, the temperature of the coating solution and the hot-dip coating time. The following is an illustration of the effect of the coating process on the resistance spot welding performance of a hot stamped component using only Embodiment 5 and Comparison Example 4 as examples. A simulated hot stamping was performed on the sheets with a thin coating in Embodiment 5 and Comparison Example 4. The heating process was carried out in a tube furnace in the laboratory. The heating temperature was 930° C., holding there for 240 s. Subsequently, the heated sample sheet was taken out, put into a hot stamping simulation device and cooled to no more than 100° C. within 8~10 s. The coating morphologies of the obtained hot stamped sample sheets were observed, and the results are shown in FIG. 4.

Figure 4:
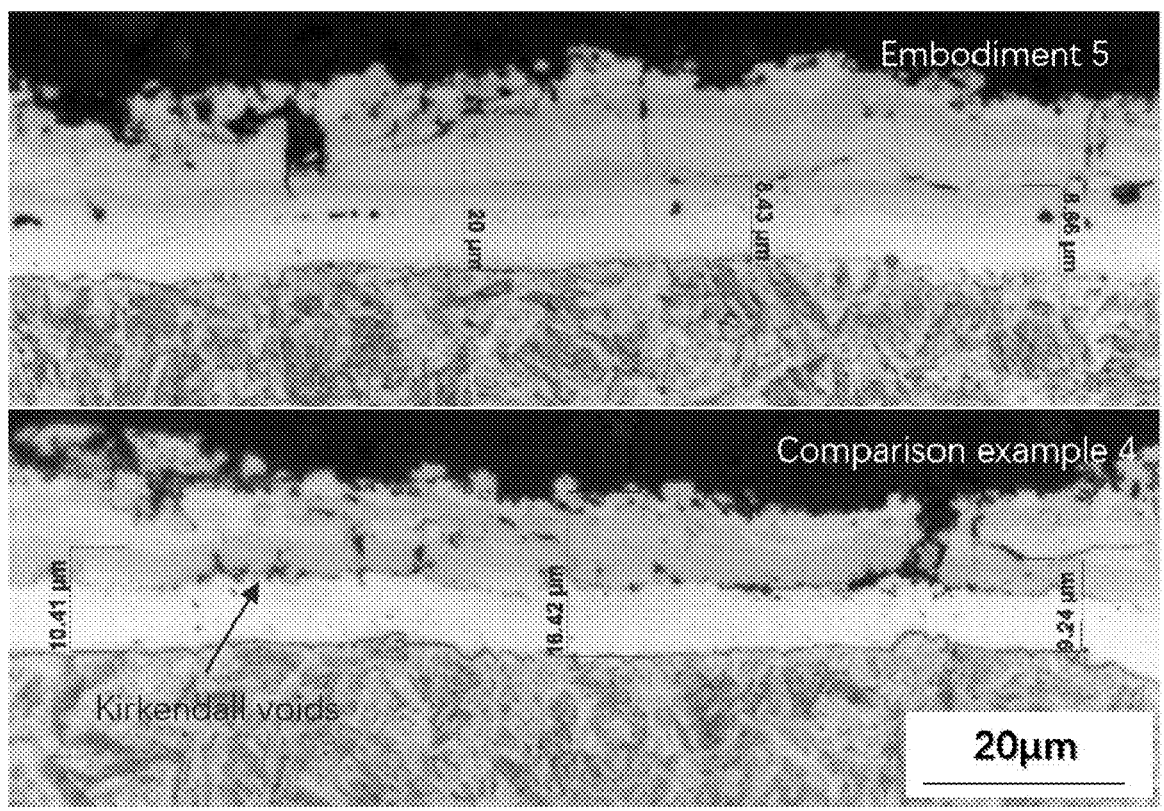
FIG. 4 is metallographs of the local coating morphology of the sample coated steel sheets of Embodiment 5 and Comparison Example 4 after hot stamping.

As can be seen from FIG. 4, under the same hot stamping conditions, the final coating thickness in Embodiment 5 was about 20 μm, and the thickness of the interdiffusion layer was about 8.55 μm, whereas the final coating thickness in Comparison Example 4 was about 16.42 μm, and the thickness of the interdiffusion layer was about 9.83 μm. In addition, the Kirkendall voids in Comparison Example 4 were substantially linearly distributed. This corresponds to the data in Table 3, wherein the numbers of initial Kirkendall voids with a diameter of 0.5 μm~2.5 μm in Embodiment 5 and Comparison Example 4 were 5 per 35 μm and 29 per 35 μm, respectively, and the maximum diameter in Embodiment 5 was 0.65 μm, whereas the maximum diameter of the initial voids in Comparison Example 4 was 1.71 μm. There were more initially large-sized Kirkendall voids in Comparison Example 4, so the voids in Comparison Example 4 are obviously more serious after being underwent the same hot stamping process.

Figure 5:
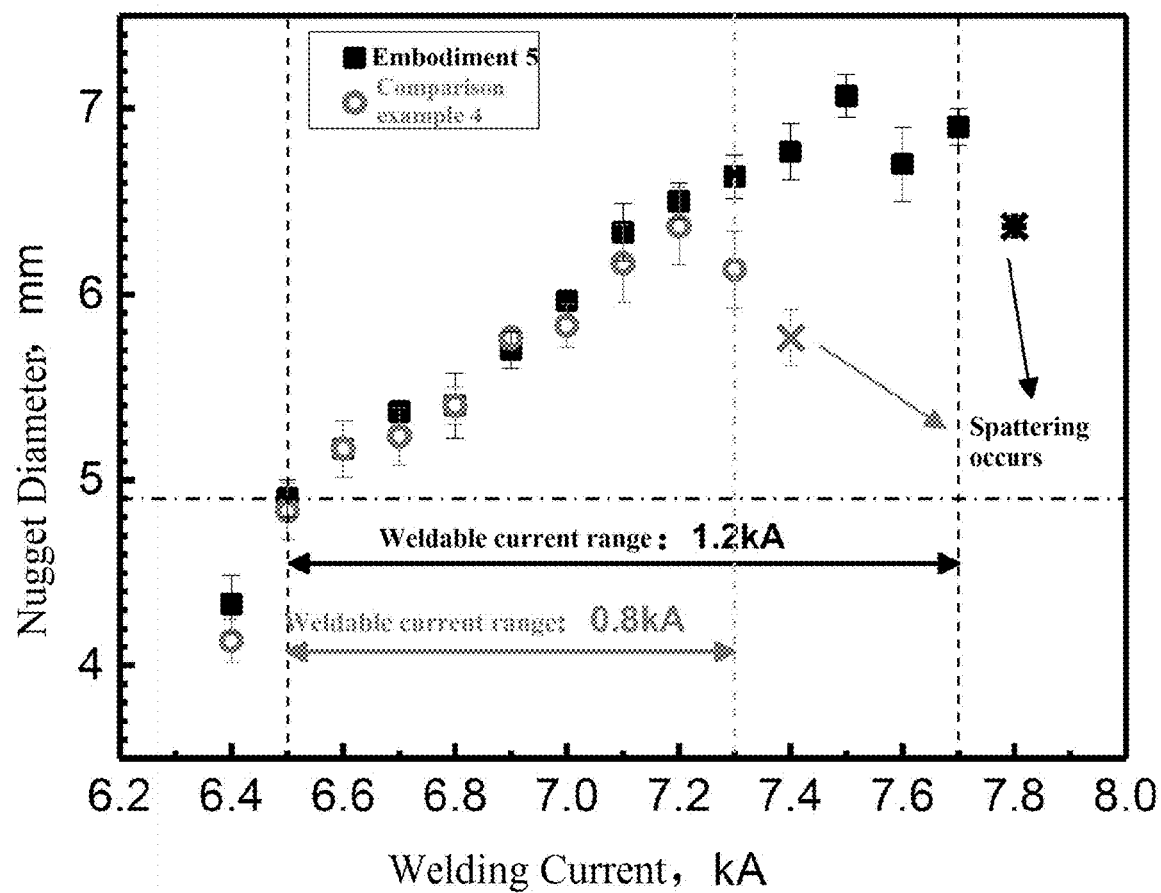
FIG. 5 is results of spot welding performance tests of the sample coated steel sheets of Embodiment 5 and Comparison Example 4 after hot stamping.

A resistance spot welding experiment was carried out on the obtained hot stamped panels. The welding method and evaluation criteria refer to the AWS D8.9M: 2012 standards. Single pulse welding was selected. The welding parameters were as follows: diameter of electrode cap end face 7 mm, electrode pressure 5.5 kN, electrode preload time 400 ms, welding time 360 ms, post-welding holding time 200 ms. FIG. 5 shows the spot welding evaluation results of two coated steel sheets after hot stamping. As can be seen from the figure, the weldable current range for spot welding the hot stamped sample sheet in Embodiment 5 was 1.2 kA, and the minimum welding current at which spatter was generated was 7.8 kA. In contrast, the weldable current range for spot welding the hot stamped sample sheet in Comparison Example 4 was 0.8 kA, and the minimum welding current at which spatter was generated was 7.4 kA. Obviously, the weldable current range for the hot stamped sample sheet in Comparison Example 4 is narrower and the current at which spatter is generated is smaller. The experimental results show that the considerable Kirkendall voids in Comparison Example 4 increase the contact resistance of the coating, such that the spattering of sparks would easily occur even at a small welding current during spot welding, resulting in a reduced weldable current range of the steel sheet. In contrast, the coated steel sheet with fewer and smaller Kirkendall voids (Embodiment 5) obtained according to the present invention improves the resistance spot welding performance of the hot stamped component.

In summary, the coating thickness of the aluminium alloy coating of the coated steel sheet of the present invention is 5~14 µm, wherein the thickness of the FeAlSi inhibitive layer is 1.5~6 µm and no more than 60% of the coating thickness. Within 2 µm from an interface between the FeAlSi inhibitive layer and a substrate steel to the interior of the substrate steel, the diameters of Kirkendall voids are no more than 2.5 µm, wherein the number of Kirkendall voids with a diameter of no less than 0.5 µm and no more than 2.5 µm does not exceed 15 per 35 µm. Aluminium alloy coated steel sheets with the above coating features can make hot stamped components with excellent resistance spot welding performance. The coating method for producing the coated steel sheet according to the present invention ensures the uniformity of the coating thickness, avoids the occurrence of skip coating on the surface, and at the same time inhibits the formation of large-sized Kirkendall voids, ensuring good resistance spot welding performance of the hot stamped components.

The above embodiments and experimental data are intended to exemplarily illustrate the present invention. It should be clear to those skilled in the art that the present invention is not limited to these embodiments, and various changes can be made without departing from the protection scope of the present invention.

What is claimed is:

1. A coated steel sheet with an aluminium alloy coating for hot stamping, comprising a substrate steel sheet and the aluminium alloy coating coated on at least one surface thereof,
   wherein the substrate steel sheet comprises the following constituents by weight: 0.05~0.45% C, 0.5~10% Mn, 0~0.01% B, 0~0.4% Nb+Ti+V, 0.01~2% Si, 0.01~2% Al, 0.01~5% Cr+Ni+Mo+Cu and 0~2% Cr, 0~2% Ni, 0~2% Mo and 0~2% Cu, and the balance of Fe and unavoidable impurity elements,
   wherein a total coating thickness of the aluminium alloy coating is 5~14 µm,
   wherein the aluminium alloy coating comprises: a FeAlSi inhibitive layer adjacent to the substrate steel sheet; and an Al alloy layer outside the FeAlSi inhibitive layer,
   wherein a thickness of the FeAlSi inhibitive layer is no more than 60% of the total coating thickness of the aluminium alloy coating, and the thickness of the FeAlSi inhibitive layer is 1.5~6 µm,
   wherein, at a location within 2 µm from an interface between the FeAlSi inhibitive layer and the substrate steel sheet to an interior of the substrate steel sheet, diameters of Kirkendall voids are no more than 2.5 µm, wherein a number of Kirkendall voids with a diameter of no less than 0.5 µm and no more than 2.5 µm does not exceed 15 per 35 µm, and
   wherein the number of Kirkendall voids is determined by the following: in a field of view of an SEM image of a vertical cross-section at the location, the number of Kirkendall voids within a length of 35 µm are counted, and the diameter of each Kirkendall void is determined by: in the field of view, a longest diameter and a shortest diameter of the Kirkendall void are measured and the diameter of the Kirkendall void is equal to half of a sum of the longest diameter and the shortest diameter.

2. The coated steel sheet according to claim 1, wherein the substrate steel sheet comprises the following constituents by weight: 0.09~0.39% C, 0.6~3.5% Mn, 0~0.004% B, 0~0.4% Nb+Ti+V, 0.01~2% Si, 0.01~2% Al, 0.01~5% Cr+Mo+Ni+Cu and 0~2% Cr, 0~2% Ni, 0~2% Mo and 0~2% Cu, and the balance of Fe and unavoidable impurity elements.

3. The coated steel sheet according to claim 1, wherein the substrate steel sheet comprises the following constituents by weight: 0.18~0.39% C, 0.6~3.5% Mn, 0~0.004% B, 0.05~0.25% Nb+Ti+V, 0.01~2% Si, 0.01~2% Al, 0.01~5% Cr+Mo+Ni+Cu and 0~2% Cr, 0~2% Ni, 0~2% Mo and 0~2% Cu, and the balance of Fe and unavoidable impurity elements.

4. The coated steel sheet according to claim 1, wherein the total coating thickness of the aluminium alloy coating is 6~13 µm, the thickness of the FeAlSi inhibitive layer is no more than 50% of the total coating thickness of the aluminium alloy coating, and the thickness of the FeAlSi inhibitive layer is 1.5~5 µm.

5. The coated steel sheet according to claim 1, wherein the total coating thickness of the aluminium alloy coating is 7~12 µm, the thickness of the FeAlSi inhibitive layer is no more than 40% of the total coating thickness of the aluminium alloy coating, and the thickness of the FeAlSi inhibitive layer is 2.45~3.95 µm.

6. The coated steel sheet according to claim 1, wherein, at the location within 2 µm from the interface between the FeAlSi inhibitive layer and the substrate steel sheet to the interior of the substrate steel sheet, the number of Kirkendall voids with the diameter of no less than 0.5 µm and no more than 2.5 µm does not exceed 13 per 35 µm.

7. The coated steel sheet according to claim 1, wherein, at the location within 2 µm from the interface between the FeAlSi inhibitive layer and the substrate steel sheet to the interior of the substrate steel sheet, the number of Kirkendall voids with the diameter of no less than 0.5 µm and no more than 2.5 µm does not exceed 10 per 35 µm.

8. The coated steel sheet according to claim 1, wherein, at the location within 2 µm from the interface between the FeAlSi inhibitive layer and the substrate steel sheet to the interior of the substrate steel sheet, the diameters of the Kirkendall voids are no more than 2.0 µm, and the number of Kirkendall voids with the diameter of no less than 0.5 µm and no more than 2.0 µm does not exceed 10 per 35 µm.

9. The coated steel sheet according to claim 1, wherein the thickness of the substrate steel sheet is 0.5~3.0 mm.

10. A coated steel sheet with an aluminium alloy coating for hot stamping, comprising a substrate steel sheet and the aluminium alloy coating coated on at least one surface thereof,
    wherein the aluminium alloy coating comprises:
        a FeAlSi inhibitive layer adjacent to the substrate steel sheet, and
        an Al alloy layer outside the FeAlSi inhibitive layer,
    wherein a thickness of the FeAlSi inhibitive layer is no more than 60% of a total coating thickness of the aluminium alloy coating, and the thickness of the FeAlSi inhibitive layer is 1.5~6 μm,
    wherein, at a location within 2 μm from an interface between the FeAlSi inhibitive layer and the substrate steel sheet to an interior of the substrate steel sheet, diameters of Kirkendall voids are no more than 2.5 μm,
    wherein a number of Kirkendall voids with a diameter of no less than 0.5 μm and no more than 2.5 μm does not exceed 15 per 35 μm, and
    wherein the number of Kirkendall voids is determined by the following: in a field of view of an SEM image of a vertical cross-section at the location, the number of Kirkendall voids within a length of 35 μm are counted, and the diameter of each Kirkendall void is determined by: in the field of view, a longest diameter and a shortest diameter of the Kirkendall void are measured and the diameter of the Kirkendall void is equal to half of a sum of the longest diameter and the shortest diameter.

11. The coated steel sheet according to claim 10, wherein the substrate steel sheet comprises the following constituents by weight: 0.09~0.39% C, 0.6~3.5% Mn, 0~0.004% B, 0~0.4% Nb+Ti+V, 0.01~2% Si, 0.01~2% Al, 0.01~5% Cr+Mo+Ni+Cu and 0~2% Cr, 0~2% Ni, 0~2% Mo and 0~2% Cu, and the balance of Fe and unavoidable impurity elements.

12. The coated steel sheet according to claim 10, wherein the substrate steel sheet comprises the following constituents by weight: 0.18~0.39% C, 0.6~3.5% Mn, 0~0.004% B, 0.05~0.25% Nb+Ti+V, 0.01~2% Si, 0.01~2% Al, 0.01~5% Cr+Mo+Ni+Cu and 0~2% Cr, 0~2% Ni, 0~2% Mo and 0~2% Cu, and the balance of Fe and unavoidable impurity elements.

13. The coated steel sheet according to claim 10, wherein the total coating thickness of the aluminium alloy coating is 6~13 μm and the thickness of the FeAlSi inhibitive layer is no more than 50% of the total coating thickness of the aluminium alloy coating.

14. The coated steel sheet according to claim 10, wherein the total coating thickness of the aluminium alloy coating is 7~12 μm and the thickness of the FeAlSi inhibitive layer is no more than 40% of the total coating thickness of the aluminium alloy coating.

15. The coated steel sheet according to claim 10, wherein, at the location within 2 μm from the interface between the FeAlSi inhibitive layer and the substrate steel sheet to the interior of the substrate steel sheet, the number of Kirkendall voids with the diameter of no less than 0.5 μm and no more than 2.5 μm does not exceed 13 per 35 μm.

16. The coated steel sheet according to claim 10, wherein, at the location within 2 μm from the interface between the FeAlSi inhibitive layer and the substrate steel sheet to the interior of the substrate steel sheet, the number of Kirkendall voids with the diameter of no less than 0.5 μm and no more than 2.5 μm does not exceed 10 per 35 μm.

17. The coated steel sheet according to claim 10, wherein, at the location within 2 μm from the interface between the FeAlSi inhibitive layer and the substrate steel sheet to the interior of the substrate steel sheet, the diameters of the Kirkendall voids are no more than 2.0 μm, and the number of Kirkendall voids with the diameter of no less than 0.5 μm and no more than 2.0 μm does not exceed 10 per 35 μm.

18. The coated steel sheet according to claim 10, wherein the substrate steel sheet comprises the following constituents by weight: 0.05~0.45% C, 0.5~10% Mn, 0~0.01% B, 0~0.4% Nb+Ti+V, 0.01~2% Si, 0.01~2% Al, 0.01~5% Cr+Ni+Mo+Cu and 0~2% Cr, 0~2% Ni, 0~2% Mo and 0~2% Cu, and the balance of Fe and unavoidable impurity elements.

19. A coating method for coating a thin aluminium alloy coating onto at least one surface of a substrate steel sheet for hot stamping, comprising:
    a) pre-treating the substrate steel sheet before coating;
    b) after heating the pre-treated substrate steel sheet, cooling it to a predetermined temperature in the range of 610~650° C.;
    c) dipping the substrate steel sheet cooled to the predetermined temperature in step b) in a heated coating solution for 2~7 seconds for hot-dip coating, wherein the composition of the coating solution comprises by weight: 9%~12% Si, and the balance of Al or Al alloy and unavoidable impurities; in the process, the temperature of the coating solution is higher than the predetermined temperature and maintained at 630~670° C.;
    d) after the substrate steel sheet is out of the coating solution and before the coating solution on the at least one surface of the substrate steel sheet solidifies, removing excessive coating solution on the at least one surface by air knife purge to control a coating thickness on the at least one surface; and
    e) cooling the substrate steel sheet to room temperature to obtain a coated steel sheet with a thin aluminium alloy coating,
    wherein the substrate steel sheet comprises the following constituents by weight: 0.05~0.45% C, 0.5~10% Mn, 0~0.01% B, 0~0.4% Nb+Ti+V, 0.01~2% Si, 0.01~2% Al, 0.01~5% Cr+Ni+Mo+Cu and 0~2% Cr, 0~2% Ni, 0~2% Mo and 0~2% Cu, and the balance of Fe and unavoidable impurity elements,
    wherein the aluminium alloy coating comprises: a FeAlSi inhibitive layer adjacent to the substrate steel sheet; and an Al alloy layer outside the FeAlSi inhibitive layer,
    wherein a thickness of the FeAlSi inhibitive layer is no more than 60% of the total coating thickness of the aluminium alloy coating, and the thickness of the FeAlSi inhibitive layer is 1.5~6 μm,
    wherein, at a location within 2 μm from an interface between the FeAlSi inhibitive layer and the substrate steel sheet to an interior of the substrate steel sheet, diameters of Kirkendall voids are no more than 2.5 μm, wherein a number of Kirkendall voids with a diameter of no less than 0.5 μm and no more than 2.5 μm does not exceed 15 per 35 μm, and
    wherein the number of Kirkendall voids is determined by the following: in a field of view of an SEM image of a vertical cross-section at the location, the number of Kirkendall voids within a length of 35 μm are counted, and the diameter of each Kirkendall void is determined by: in the field of view, a longest diameter and a shortest diameter of the Kirkendall void are measured and the diameter of the Kirkendall void is equal to half of a sum of the longest diameter and the shortest diameter.

20. The method according to claim 19, wherein the predetermined temperature is in the range of 620~639° C., the temperature of the coating solution is higher than the predetermined temperature by 5~20° C.

21. The method according to claim 20, wherein the predetermined temperature is in the range of 625~635° C., the temperature of the coating solution is higher than the predetermined temperature by 7~15° C.

22. The method according to claim 19, wherein Si content in the aluminium solution for hot-dip coating is 9.2%~11.2% by weight.

* * * * *